United States Patent
Huras et al.

(10) Patent No.: US 6,684,225 B1
(45) Date of Patent: Jan. 27, 2004

(54) DROPPED DATABASE TABLE RECOVERY

(75) Inventors: Matthew Albert Huras, Ajax (CA); Dale M. McInnis, Aurora (CA); Effi Ofer, Thornhill (CA); Michael J. Winer, Markham (CA); Roger Luo Q. Zheng, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 09/626,673

(22) Filed: Jul. 27, 2000

(30) Foreign Application Priority Data

Jul. 29, 1999 (CA) .............................................. 2279028

(51) Int. Cl.[7] .............................................. G06F 12/00
(52) U.S. Cl. ........................... 707/202; 707/1; 707/100; 707/203
(58) Field of Search ........................... 707/1, 100, 201, 707/202, 203, 204

(56) References Cited

U.S. PATENT DOCUMENTS

| | | | |
|---|---|---|---|
| 4,697,266 A | | 9/1987 | Finley |
| 5,553,279 A | | 9/1996 | Goldring |
| 5,555,404 A | | 9/1996 | Torbjornsen et al. |
| 5,596,710 A | | 1/1997 | Voigt |
| 5,625,815 A | | 4/1997 | Maier et al. |
| 5,991,772 A | * | 11/1999 | Doherty et al. ................. 707/1 |
| 6,055,546 A | * | 4/2000 | Pongracz et al. ........... 200/201 |
| 6,212,512 B1 | * | 4/2001 | Barney et al. ............... 345/835 |
| 6,292,808 B1 | * | 9/2001 | Obermarck et al. ........ 707/202 |
| 6,324,548 B1 | * | 11/2001 | Sorenson ..................... 707/203 |
| 6,366,917 B1 | * | 4/2002 | St. John Herbert, III ... 707/100 |

FOREIGN PATENT DOCUMENTS

| | | |
|---|---|---|
| CN | 1201950 | 12/1998 |
| JP | 61082227 | 4/1986 |
| JP | 63211445 | 9/1988 |
| JP | 3022152 | 1/1991 |
| JP | 3116249 | 5/1991 |
| JP | 4178846 | 6/1992 |
| JP | 4188342 | 7/1992 |
| JP | 5181729 | 7/1993 |

\* cited by examiner

*Primary Examiner*—Kim Vu
*Assistant Examiner*—Chongshan Chen
(74) *Attorney, Agent, or Firm*—David W. Victor; Konrad, Raynes, Victor & Mann LLP

(57) ABSTRACT

A database management system having a dropped table recovery flag. If the dropped table recovery flag is on at the time that a table is dropped, an entry will be made in a dropped table history file. The dropped table history file contains a timestamp of the time of table drop, a unique dropped table identifier, and table definition information. The system includes a command to permit the table-space of a dropped table to be restored and rolled forward to the point of the dropped table drop. The restored and rolled forward dropped table data is written to a flat file. The flat file data is loaded into a recreated table in the current table space to recover the dropped table.

30 Claims, 1 Drawing Sheet

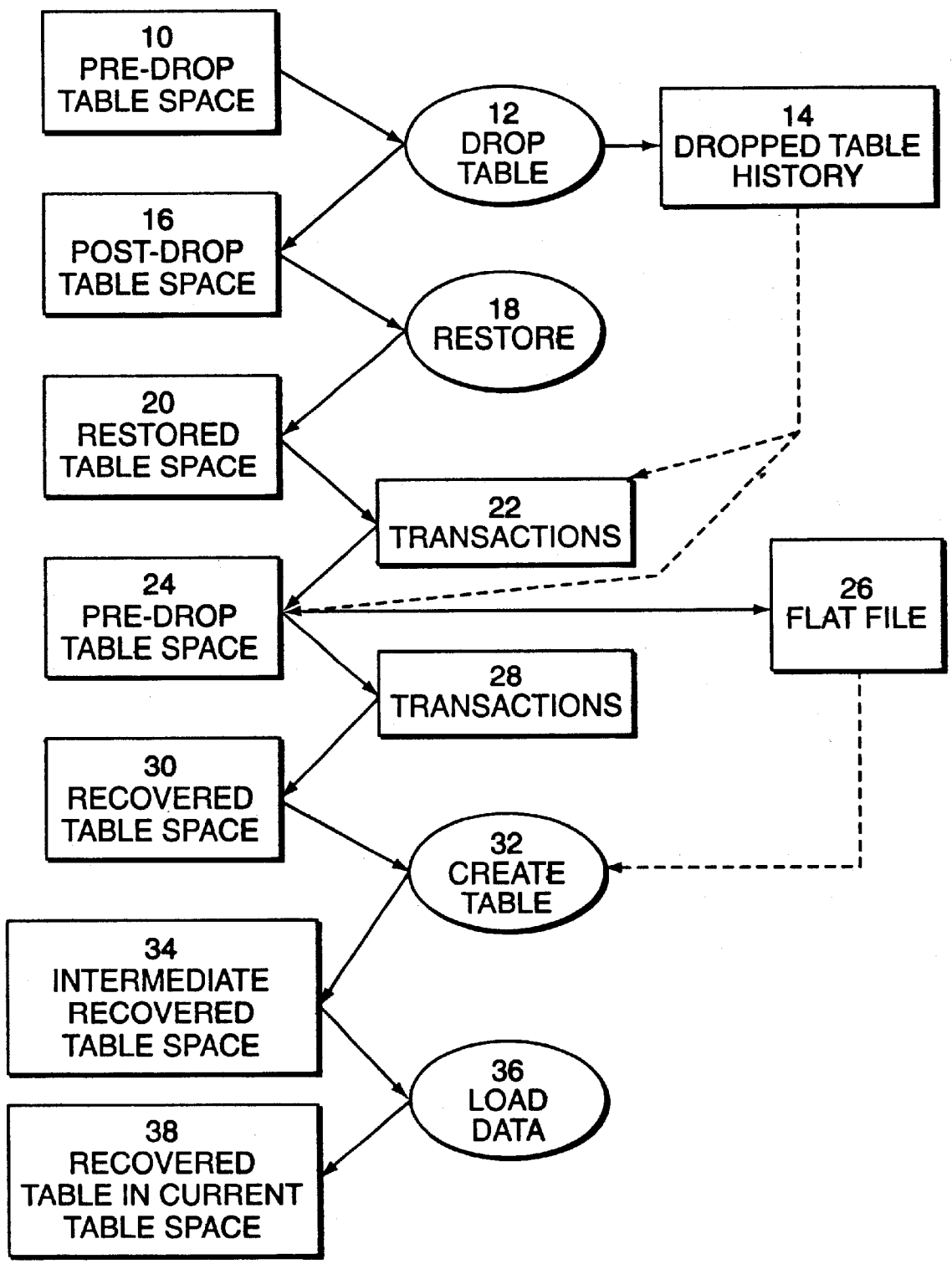

DROPPED DATABASE TABLE RECOVERY

RELATED FOREIGN APPLICATION

This patent application claims priority from the commonly assigned Canadian Patent Application entitled "Dropped Database Table Recovery", having Canadian Patent Application Serial No. 2,279,028, filed on Jul. 29, 1999 by Effi Ofer, Roger Luo Q. Zheng, Matthew A. Huras, Michael J. Winer, and Dale M. McInnis, which application is incorporated herein by reference in its entirety.

1. Field of the Invention

The present invention is directed to an improvement in database systems and in particular to the recovery of tables dropped from databases.

2. Background of the Invention

In relational databases, data is organized into tables. A collection of such tables in a database is referred to as a table space. Database users sometimes inadvertently delete, or drop, a table from a table space. Typically, a database management system (DBMS) does not permit undelete of the drop action: once the table drop is committed, the table's data is permanently deleted and cannot be brought back by way of such a command as an undelete of the drop statement. Instead, the data must be restored from a backup and then the data rolled forward by replaying stored transactions on the data, a potentially slow process.

In certain DBMS environments, such as DB2**, recovering a dropped table is made even more difficult by the fact that a table space restore followed by a roll forward of the table space to a point in time prior to the drop cannot be done. This restriction means that to roll forward to recover a dropped table, the entire database, and not only the effected table space, must be rolled forward. This restriction on the roll forward of the table space is due to the minimum recovery time property. A table space must be rolled forward to at least the minimum recovery time so that it is synchronized with the information in the system catalog tables. The minimum recovery time is updated when data definition language (DDL) statements are executed against a table space, or against tables in a table space.

**DB2 is a registered trademark of International Business Machines Corp.

The minimum recovery time will be later than the time at which the table was dropped. Because of this fact, it is a requirement in typical DBMS environments that the user must recover the entire database. This means that the entire database becomes unavailable to other users while the recovery and rollforward of the database is being carried out. It is typically slower to perform the recovery and restore on the entire database than a recovery and rollforward on the effected table space, only.

The only means in which a dropped table can be currently recovered in many relational databases, such as DB2, is through a database restore followed by a database roll forward to a point in time just prior to the table drop. As indicated above, such an approach will make the database as a whole unavailable to users. It may also be difficult to pinpoint when a table was dropped and therefore data will often be inaccurately retrieved due to uncertainties about when the table in question was dropped. In addition, the structure of the table may no longer be accurately known.

It is therefore desirable to have a DBMS in which tables that have been dropped may be recovered without the need to recover and roll forward the entire database and which permits the point at which the table was dropped to be determined with some accuracy, as well as to determine the structure of the table at the time of the drop.

SUMMARY OF THE PREFERRED EMBODIMENTS

According to one aspect of the preferred embodiments, there is provided an improved database management system for recovering data in a database comprised of at least one table space. Each table space is capable of including at least one table. An indication is made in a data structure of a time at which a table in a database table space was removed from the table space. The table space including the table is restored to a state prior to the time at which the table was removed from the database. Stored transactions for the table space are applied against the restored table space to make the restored table space current as of time the table was removed from the database as indicated in the data structure. The removed table is recovered from the restored table space.

According to another aspect of the preferred embodiments, there is provided a database management system comprising one or more table spaces, each table space containing one or more tables having table definition attributes, means for generating, for a dropped table in a selected table space, a time stamp reflecting the time of drop and a unique table identifier, a dropped table history means for storing the table identifier, the time stamp and the table definition attributes for the dropped table, means for restoring and rolling forward the selected table space containing the dropped table to the time reflected in the time stamp by replaying a first set of stored transactions up to the time reflected in the time stamp, means for copying the data from the dropped table in the rolled forward selected table space to a storage data structure, means for updating the selected table space to a desired current state, means for accessing the table definition attributes for the dropped table, in the dropped table history means, to create a new table in the table space, and means for loading the data in the storage data structure into the new table.

According to another aspect of the preferred embodiments, there is provided the above system further comprising a dropped table flag for enabling dropped table recovery for a selected table space whereby the storage of the table identifier, the time stamp and the table definition attributes for the dropped table are conditional on the dropped table flag.

According to another aspect of the preferred embodiments, there is provided the above system in which the means for updating the selected table space to a desired current state comprises a user-defined time up to which user-defined time a second set of stored transactions after the time reflected in the time stamp are replayed against the selected table space.

According to another aspect of the preferred embodiments, there is provided the above system further comprising a means for storing a current state of the selected table space and in which the means for updating the selected table space to a desired current state further comprises a means to retrieve the stored current state of the selected table space.

According to another aspect of the preferred embodiments, there is provided a computer program product for use with a computer comprising a central processing unit and random access memory, said computer program product comprising a computer usable medium having computer readable code means embodied in said medium for managing a database, as described with respect to the above systems.

According to another aspect of the preferred embodiments, there is provided a method for recovering a dropped table in a database management system comprising one or more table spaces, each table space containing one or more tables having table definition attributes, the method comprising the following steps:

(a) generating, for a dropped table in a selected table space, a time stamp reflecting the time of drop and a unique table identifier, (b) storing the table identifier, the time stamp and the table definition attributes for the dropped table in a dropped table history data structure, (c) restoring and rolling forward the selected table space containing the dropped table to the time reflected in the time stamp by replaying a first set of stored transactions up to the time reflected in the time stamp, (d) copying the data from the dropped table in the rolled forward selected table space to a storage data structure, (e) updating the selected table space to a desired current state, (f) accessing the table definition attributes for the dropped table, in the dropped table history data structure, to create a new table in the table space, and (g) loading the data in the storage data structure into the new table.

According to another aspect of the preferred embodiments, there is provided the above method further comprising the step of setting a dropped table flag for enabling dropped table recovery for a selected table space whereby the storage of the table identifier, the time stamp and the table definition attributes for the dropped table are conditional on the dropped table flag being set.

According to another aspect of the preferred embodiments, there is provided the above method in which the step of updating the selected table space to a desired current state is dependent on a user-defined time up to which user-defined time a second set of stored transactions after the time reflected in the time stamp are replayed against the selected table space.

According to another aspect of the preferred embodiments, there is provided the above method further comprising the step of storing a current state of the selected table space prior to restoring and rolling forward the selected table space and in which the means for updating the selected table space to a desired current state further comprises the step of retrieving the stored current state of the selected table space.

According to another aspect of the preferred embodiments, there is provided a computer program product tangibly embodying a program of instructions executable by a computer to perform the above method steps.

Advantages of the preferred embodiments include the ability to restore and rollforward the table space of the dropped table without having to restore the entire database. In addition, the dropped table history records a timestamp for the drop of the dropped table to permit the rollforward to the drop of the table to be carried out with some accuracy. The structure of the table which has been dropped is also available for use in the recovery of the table.

BRIEF DESCRIPTION OF THE DRAWINGS

Referring now to the drawings in which like reference numbers represents corresponding parts throughout:

FIG. 1 is a block diagram showing the processing of the table space to recover a dropped table, in accordance with the system of the preferred embodiments.

In the drawing, the preferred embodiments of the invention are illustrated by way of example. It is to be expressly understood that the description and drawing are only for the purpose of illustration and as an aid to understanding, and are not intended as a definition of the limits of the invention.

DETAILED DESCRIPTION OF THE PREFERRED EMBODIMENTS

Referring to FIG. 1, there is a block diagram showing the processing of a table space to recover a dropped table. Pre-drop table space 10 represents a table space in a database which pre-drop table space 10 is in a state immediately preceding the point of commitment for drop table command 12. In the preferred embodiments, the database is a relational database which implements SQL, such as the DB2 DBMS. The system of the preferred embodiments permits a user to turn "on" a dropped table recovery flag. A sample SQL command to turn "on" the dropped table recover flag for an example table space ts1 is:

alter table space ts1 using dropped table recovery on

If this flag is turned on for a table space, the system of the preferred embodiments will create an entry in a dropped table history 14 data structure, when a table (ts1, in the above example) is dropped from pre-drop table space 10. Dropped table history 14 records a dropped table ID, which is a unique identifier for the dropped table. Dropped table history 14 also provides a timestamp which reflects the time at which the dropped table was dropped from the table space, as well as information about the structure of the table (table definition attributes). The option to record an entry in the dropped table history 14 is table space specific. In the preferred embodiments, the flag may be queried in the "syscat.tablespaces" catalog table. There is a drop_recovery column which may be queried. The flag may be turned "off" and "on" by the user as required. When a table is dropped in the system of the preferred embodiments, the status of the flag is determined by the system and if the flag is "on", then information about the dropped table is stored in dropped table history 14.

In the system of the preferred embodiments, the dropped table history 14 may be accessed by the LIST HISTORY DROPPED TABLE command. This command returns the dropped table ID, timestamp of the drop, and information about the structure of the table. An example of the command for the database test_db is as follows:

list history dropped table all for test-db

After accessing the dropped table history 14 in this way, the user of the system of the preferred embodiments may then restore the table space. An example of such a command for table space ts1 in database test_db is:

restore db test_db tablespace (ts1)

In FIG. 1, a post-drop table space 16 represents the state of the table space after the drop table command 12 has been committed. It is expected that a number of transactions (not shown) will have been processed and that the post-drop table space 16 may differ significantly from the state of the pre-drop table space 10.

FIG. 1 shows the execution of restore command 18. This results in a restored table space 20. The restored table space 20 must pre-date the pre-drop table space 10. The user then uses the rollforward command in the system of the preferred embodiments to replay stored transactions 22 against restored table space 20. The system of the preferred embodiment permits the user to stop the rollforward of restored table space 20 at the timestamp found in the dropped table history 14 for the table which was inadvertently dropped.

The rollforward command of the preferred embodiment permits the user to specify that the rollforward is to stop at the drop point for a table with a given dropped table ID. In FIG. 1, transactions 22 are shown as being played against the restored table space 20, up to the point indicated by dropped table history 14. The result is the pre-drop table space 24. The state of the pre-drop table space 24 is intended to be materially equivalent to the state of pre-drop table space 10. The system has effectively permitted the recreation of the table space to the state of pre-drop table space 10, to permit the data from the dropped table to be extracted from the table space as it existed immediately prior to the drop table command 12 being committed in the system. Once the appropriate transactions have been replayed against restored table space 20 to create pre-drop table space 24, a copy of the dropped table is made in flat file 26.

To accomplish this the user specifies a file location and the table data as it existed prior to drop will be written to the file as a flat file with ASCII delimiters. An example rollforward command for the database test_db, table space ts1, dropped table ID "00000000000000b60000" is shown where the flat file representation of the table is to be stored in file location /temp/ffile.

rollforward db test_db to end of logs and stop
    tablespace (ts1) recover dropped table
    00000000000000b60000 to temp/ffile With reference to FIG. 1, once the data from the dropped table in pre-drop table space 24 has been saved to flat file 26, further transactions 28 may be replayed on pre-drop table space 24 to result in recovered table space 30. The dropped table may be redefined in recovered table space 30 by create table command 32. The result is intermediate recovered table space 34. Load data command 36 repopulates the table created by create table command 32 from flat file 26 to create recovered table in current table space 38. In this way, the dropped table is recovered in the table space without the need to restore the entire database. It will be appreciated by those skilled in the art that although in FIG. 1 the various table spaces 10, 16, 20, 24, 30, 34 and 38 are shown as separate items, a typical implementation of the preferred embodiment uses the same table space for all items, although the state of the table space varies over time, as described above.

By replaying transactions on the table space only, rather than on the database as a whole, the database remains available for use by other users and the time to recover the dropped table is potentially shorter. The data from the dropped table is stored in flat file 26 to permit the data to be recovered into a table space which has different attributes than the table space from which the table was dropped. Dropped table history 14 includes dropped table characteristics which permit the table to be redefined in intermediate recovered table space 34 by create table command 32.

In SQL commands, the above procedure may be carried out using the following steps. An example of how to define the table into which the dropped table data will be copied is the following SQL command:

create table "test "."table1 " ("col1 " integer) in "ts1"

The table is then repopulated from flat file 25 using a command:

load from data of del insert into table 1

As will be apparent to one skilled in the art, there are other variations on the above approach to recovering the dropped table, given the system of the preferred embodiment. In particular, the recovery of the dropped table may be accomplished by restoring the database as a whole into a different system than the first database. The table space can then be restored in the second system and the rollforward and recovery of the dropped table carried out "offline". This will permit the existing database to be used without making even the table space of the dropped table unavailable to users of the system. Another alternative to the steps described above is to make a copy of the current table space before carrying out the restore of the table space. Once flat file 26 is created, transactions 28 may be ignored and recovered table space 30 may be created by restoring the copy of the current table space, rather than by replaying transactions 28 on pre-drop table space 24. This alternative approach is advantageous where there are significant numbers of transactions in transactions 28.

As will also be apparent to those skilled in the art, flat file 26 may have other uses, and the data in flat file 26 may be exported to other applications or used in the database in other contexts than the repopulation of the dropped table.

Although preferred embodiments have been described here in detail, it will be appreciated by those skilled in the art, that variations may be made thereto, without departing from the spirit of the invention or the scope of the appended claims.

What is claimed is:

1. A database management system comprising:
    one or more table spaces, each table space containing one or more tables having table definition attributes;
    means for generating, for a dropped table in a selected table space, a time stamp reflecting the time of drop and a unique table identifier;
    a dropped table history means for storing the table identifier, the time stamp and the table definition attributes for the dropped table upon determining that a dropped table flag associated with the selected table space has a first value that indicates that information about the dropped table is to be recorded in the dropped table history means, wherein the dropped table flag is set with the first value prior to the table being dropped;
    means for restoring and rolling forward the selected table space containing the dropped table to the time reflected in the time stamp by replaying a first set of stored transactions up to the time reflected in the time stamp, wherein information about the dropped table is stored in the dropped table history means;
    means for copying data from the dropped table in the rolled forward selected table space to a storage data structure;
    means for updating the selected table space to a desired current state;
    means for accessing the table definition attributes for the dropped table, in the dropped table history means, to create a new table in the table space; and
    means for loading the data in the storage data structure into the new table.

2. The system of claim 1 wherein the dropped table flag enables dropped table recovery for a selected table space whereby the storage of the table identifier, the time stamp and the table definition attributes for the dropped table are conditional on the dropped table flag.

3. The system of claim 1 in which the storage data structure is a flat file.

4. The system of claim 1 in which the means for updating the selected table space to a desired current state comprises a user-defined time up to which a second set of stored transactions after the time reflected in the time stamp are replayed against the selected table space.

5. The system of claim 1 further comprising a means for storing a current state of the selected table space and in which the means for updating the selected table space to a desired current state further comprises a means to retrieve the stored current state of the selected table space.

6. A computer program product for use with a computer comprising a central processing unit and random access memory, said computer program product comprising a computer usable medium having computer readable code means embodied in said medium for managing a database comprising one or more table spaces, each table space containing one or more tables having table definition attributes, said computer program product comprising:

- computer readable program code means for causing a computer to generate for a dropped table in a selected table space, a time stamp reflecting the time of drop and a unique table identifier;
- computer readable program code means for causing a computer to create and maintain a dropped table history means for storing the table identifier, the time stamp and the table definition attributes for the dropped table upon determining that a dropped table flag associated with the selected table space has a first value that indicates that information about the dropped table is to be recorded in the dropped table history means, wherein the dropped table flag is set with the first value prior to the table being dropped;
- computer readable program code means for causing a computer to restore and roll forward the selected table space containing the dropped table to the time reflected in the time stamp by replaying a first set of stored transactions up to the time reflected in the time stamp, wherein information about the dropped table is stored in the dropped table history means;
- computer readable program code means for causing a computer to copy data from the dropped table in the rolled forward selected table space to a storage data structure;
- computer readable program code means for causing a computer to update the selected table space to a desired current state;
- computer readable program code means for causing a computer to access the table definition attributes for the dropped table, in the dropped table history means, to create a new table in the table space; and
- computer readable program code means for causing a computer to load the data in the storage data structure into the new table.

7. The computer program product of claim 6, wherein the dropped table flag enables dropped table recovery for a selected table space whereby the storage of the table identifier, the time stamp and the table definition attributes for the dropped table are conditional on the dropped table flag.

8. The computer program product of claim 6 in which the storage data structure is flat file.

9. The computer program product of claim 6 in which the computer readable program code means for causing a computer to update the selected table space to a desired current state comprises a user-defined time up to which a second set of stored transactions after the time reflected in the time stamp are replayed against the selected table space.

10. The computer program product of claim 6 further comprising a computer readable program code means for causing a computer to store a current state of the selected table space and in which the computer readable program code means for causing a computer to update the selected table space to a desired current state further comprises a means to retrieve the stored current state of the selected table space.

11. A method for recovering a dropped table in database management system comprising one or more table spaces, each table space containing one or more tables having table definition attributes, the method comprising:

(a) generating, for a dropped table in a selected table space, a time stamp reflecting the time of drop and a unique table identifier;

(b) storing the table identifier, the time stamp and the table definition attributes for the dropped table in a dropped table history data structure upon determining that a dropped table flag associated with the selected table space has a first value that indicates that information about the dropped table is to be recorded in the dropped table history data structure, wherein the dropped table flag is set with the first value prior to the table being dropped;

(c) restoring and rolling forward the selected table space containing the dropped table to the time reflected in the time stamp by replaying a first set of stored transactions up to the time reflected in the time stamp, wherein information about the dropped table is stored in the dropped table history data structure;

(d) copying data from the dropped table in the rolled forward selected table space to a storage data structure;

(e) updating the selected table space to a desired current state;

(f) accessing the table definition attributes for the dropped table, in the dropped table history data structure, to create a new table in the table space; and (g) loading the data in the storage data structure into the new table.

12. The method of claim 11, wherein the dropped table flag enables dropped table recovery for a selected table space whereby the storage of the table identifier, the time stamp and the table definition attributes for the dropped table are conditional on the dropped table flag being set.

13. The method of claim 11, in which the step of updating the selected table space to a desired current state is dependent on a user-defined time up to which a second set of stored transactions after the time reflected in the time stamp are replayed against the selected table space.

14. The method of claim 11, further comprising the step of storing a current state of the selected table space prior to restoring and rolling forward the selected table space and in which the means for updating the selected table space to a desired current state further comprises retrieving the stored current state of the selected table space.

15. A computer program product tangibly embodying a program of instructions executable by a computer to perform the method steps of claim 11.

16. A computer program product tangibly embodying a program of instructions executable by a computer to perform the method steps of claim 12.

17. A computer program product tangibly embodying a program of instructions executable by a computer to perform the method steps of claim 13.

18. A computer program product tangibly embodying a program of instructions executable by a computer to perform the method steps of claim 14.

19. A method for recovering data in a database comprised of at least one table space, wherein each table space is capable of including at least one table, comprising:

one or more table spaces each table space containing one or more tables having table definition attributes;

generating for a dropped table in a table space, a time reflecting the time at which the table in the database table space was removed from the table space and a unique table identifier;

indicating in a data structure the table identifier, the time at which the table in the database table space was removed from the table space, and the table definition attributes, wherein for each table space there is a flag, wherein the step of indicating in the data structure the time at which the table was removed from the table space is performed only if the flag has a first value that indicates that information about the dropped table is to be recorded in the data structure, wherein the flag is set with the first value prior to the table being removed from the table space;

restoring the table space including the table to a state prior to the time at which the table was removed from the database;

applying stored transactions for the table space against the restored table space to make the restored table space current as of the time the table was removed from the database as indicated in the data structure;

recovering the removed table from the restored table space;

copying data from the dropped table in the restored table space to a storage data structure;

updating the table space to a desired current state;

accessing the table definition attributes for the dropped table, in the data structure, to create a new table in the table space; and loading the data in the storage data structure into the new table.

20. The method of claim 19, wherein during the restoration of the table space, parts of the database excluding the table space being restored are accessible to users.

21. The method of claim 19, further comprising:

storing the restored table space to a file after the stored transactions are applied to the restored table space, wherein the removed table is generated from the table space stored in the file.

22. The method of claim 21, further comprising:

applying additional transactions to the table space stored in the file before recovering the removed table from the file.

23. A system for recovering data in a database, comprising:

a computer;

a database system accessible to the computer, wherein the database system is comprised of at least one table space, wherein each table space is capable of including at least one table;

wherein the computer includes:

(i) one or more table spaces, each table space containing one or more tables having table definition attributes;

(ii) means for generating, for a dropped table in a table space, a time reflecting the time at which the table in the database table space was removed from the table space and a unique table identifier;

(iii) means for indicating in a data structure the table identifier, the time at which the table in the database table space was removed from the table space, and the table definition attributes, wherein for each table space there is a flag, wherein the step of indicating in the data structure the time at which the table was removed from the table space is performed only if the flag has a first value that indicates that information about the dropped table is to be recorded in the data structure, wherein the flag is set with the first value prior to the table being removed from the table space;

(iv) means for restoring the table space including the table to a state prior to the time at which the table was removed from the database;

(v) means for applying stored transactions for the table space against the restored table space to make the restored table space current as of time the table was removed from the database as indicated in the data structure;

(vi) means for recovering the removed table from the restored table space;

(vii) means for copying data from the dropped table in the restored table space to a storage data structure;

(viii) means for updating the table space to a desired current state;

(ix) means for accessing the table definition attributes for the dropped table, in the data structure, to create a new table in the table space; and (x) means for loading the data in the storage data structure into the new table.

24. The system of claim 23, wherein during the restoration of the table space, parts of the database excluding the table space being restored are accessible to users.

25. The system of claim 23, wherein the computer further comprises:

means for storing the restored table space to a file after the stored transactions are applied to the restored table space, wherein the removed table is generated from the table space stored in the file.

26. The system of claim 25, wherein the computer further comprises:

means for applying additional transactions to the table space stored in the file before recovering the removed table from the file.

27. A program for recovering data in a database comprised of at least one table space, wherein each table space is capable of including at least one table, wherein the program is implemented in a computer readable medium and capable of causing a computer to perform:

one or more table spaces, each table space containing one or more tables having table definition attributes;

generating, for a dropped table in a table space, a time reflecting the time at which the table in the database table space was removed from the table space and a unique table identifier;

indicating in a data structure the table identifier, the time at which the table in the database table space was removed from the table space, and the table definition attributes, wherein for each table space there is a flag, wherein the step of indicating in the data structure the time at which the table was removed from the table space is performed only if the flag has a first value that indicates that information about the dropped table is to be recorded in the data structure, wherein the flag is set with the first value prior to the table being removed from the table space;

restoring the table space including the table to a state prior to the time at which the table was removed from the database;

applying stored transactions for the table space against the restored table space to make the restored table space current as of time the table was removed from the database as indicated in the data structure;

recovering the removed table from the restored table space;

copying data from the dropped table in the restored table space to a storage data structure;

updating the table space to a desired current state;

accessing the table definition attributes for the dropped table, in the data structure, to create, a new table in the table space; and loading the data in the storage data structure into the new table.

28. The program of claim 27, wherein during the restoration of the table space, parts of the database excluding the table space being restored are accessible to users.

29. The program of claim 27, wherein the program is further capable of causing the computer to perform:

storing the restored table space to a file after the stored transactions are applied to the restored table space, wherein the removed table is generated from the table space stored in the file.

30. The program of claim 29, wherein the program is further capable of causing the computer to perform:

applying additional transactions to the table space stored in the file before recovering the removed table from the file.

* * * * *

UNITED STATES PATENT AND TRADEMARK OFFICE
CERTIFICATE OF CORRECTION

PATENT NO.   : 6,684,225 B1
DATED        : January 27, 2004
INVENTOR(S)  : Matthew Albert Huras et al.

It is certified that error appears in the above-identified patent and that said Letters Patent is hereby corrected as shown below:

<u>Column 11,</u>
Line 11, please delete "create," and insert -- create. --.

Signed and Sealed this

Sixth Day of July, 2004

JON W. DUDAS
*Acting Director of the United States Patent and Trademark Office*